३,२८५,९९०
LIQUID PARAFFIN ISOMERIZATION PROCESS
Joe T. Kelly, Littleton, Colo., and William Schoen, Houston, Tex., assignors to Standard Oil Company, Chicago, Ill., a corporation of Indiana
No Drawing. Filed May 8, 1964, Ser. No. 366,149
12 Claims. (Cl. 260—683.7)

This application is a continuation-in-part of copending application Serial No. 194,727, filed May 14, 1962, now abandoned, which is in turn a continuation-in-part of copending application Serial No. 823,832, filed June 30, 1959, now abandoned.

This invention relates to isomerization of certain paraffins and/or certain cycloparaffins in the liquid phase, utilizing as the catalyst aluminum halide positioned on surface-hydroxyl-containing adsorbent solid.

The need for higher and higher octane numbers in gasolines is forcing the refiners either to remove low octane number components or to convert these to higher octane number components. One of the remaining places for octane number improvement lies in the lower boiling components of the gasoline, particularly in the so-called hexane fraction. This hexane fraction is a natural mixture of 6 carbon atom containing paraffins, cycloparaffins, and benzene. A very substantial increase in octane number can be obtained by converting the hexanes to more highly branched chain isomers and by converting normal pentane to isopentane. Also the demand for isobutane feed for olefin alkylation is increasing.

The processes presently available for isomerizing n-butane, n-pentane, n-hexane and the like operate at temperatures on the order of at least 212° F. and more usually at temperatures in excess of 500° F. Unfortunately the equilibrium distribution of the isomers favors the lower octane number isomers as the temperature at which the equilibrium condition is obtained increases. For example, the most favorable equilibrium condition with respect to the content of neohexane in hexane mixtures lies at about ordinary atmospheric temperature. At these temperatures of about 30° F. to about 120° F. the equilibrium hexane mixture contains at least about 50 percent of neohexane, and the equilibrium butane mixture contains at least about 70 percent of isobutane.

An object of the invention is a process for isomerizing paraffins and cycloparaffins in a liquid phase operation with a solid catalyst consisting essentially of aluminum halide positioned on surface-hydroxyl-containing adsorbent solid. Another object is a process for isomerizing these paraffins at temperatures favoring the maximum content of branched-chain isomers in the product mixture. A further object is a process for isomerizing these paraffins which requires no hydrogen along with the catalyst to inhibit side reactions. Other objects will become apparent in the course of the detailed description of the invention.

The isomerization process of the invention is applicable to an isomerizable hydrocarbon feed which may be a paraffin or a mixture of paraffins having from 4–7 carbon atoms; and/or a cycloparaffin or mixture of cycloparaffins having a 5 carbon atom and/or 6 carbon atom ring as the nucleus and a total of 6–9 carbon atoms in the compound. The feed contains from 0 to about 20 volume percent of one or more cycloparaffins. The feed to the process contains not more than about 0.5 volume percent of aromatic hydrocarbons. The feed and other hydrocarbons are in the liquid state when contacted in the isomerization zone with the catalyst at a temperature from about 30° F. to about 160° F.; the contacting time is at least sufficient to obtain a substantial degree of isomerization. The process is capable of converting the isomerizable feed to very near the attainable equilibrium mixture. The contacting is carried out in the presence of a solid particulate catalyst. The preferred catalyst consists essentially of aluminum chloride in an amount of between about 10 to 50 weight percent positioned on surface-hydroxyl-containing particulate adsorbent alumina.

The isomerization process of the invention effectively converts the feed to a mixture of isomers leading toward and, at reasonable contacting times, attaining substantially the equilibrium mixture at the particular temperature of contacting. It has been observed that at these temperatures the attainable equilibrium mixture of hexane isomers contains somewhat less neohexane than the theoretical equilibrium mixture predicted from thermodynamic data. In general, the isomerization zone is maintained at a temperature from about 30° F. to about 160° F. The particular temperature of contacting is determined by the type of feed charged and the desired contacting time. A particularly effective range for converting hexanes, either individual isomers or a natural mixture obtained from petroleum refining, is from about 80° F. to about 125° F. In this range of temperatures the hexane feed produces a product containing on the order of 45–50 percent of neohexane. A particularly effective temperature for converting n-butane to i-butane is in the range of about 100–140° F. The conversion of n-pentane to i-pentane readily takes place over these ranges, particularly at about 90 to about 120° F.

The feed to the isomerization process of the invention may be a paraffin, a cycloparaffin, a mixture of paraffins—either isomers or different number of carbon atom containing hydrocarbons, a mixture of cycloparaffins—either isomers or different number of carbon atom containing hydrocarbons, or a mixture of paraffins and cycloparaffins. The paraffins have 4–7 carbon atoms. Illustrative examples of these paraffins are n-butane, n-pentane, n-hexane, n-heptane, 2 methylpentane, and methylhexane. The cycloparaffins, which are suitable as charge to the process contain either a 5 carbon atom ring (nucleus) or a 6 carbon atom ring and contain from 6–9 carbon atoms in the compound. Illustrative examples of cycloparaffins are methylcyclopentane, dimethylcyclopentane, ethylcyclopentane, cyclohexane, methylcyclohexane, dimethylcyclohexane, ethylcyclohexane, and methylethylcyclohexane.

The catalyst utilized in the process of the invention is extremely susceptible to poisoning by aromatic hydrocarbons, such as benzene, toluene, xylene, hexaethylbenzene, and naphthalenes. The maximum aromatic hydrocarbon content tolerable in the feed is dependent somewhat on the particular catalyst and the temperature of contacting, but, in general, not more than about 0.5 volume percent of aromatic hydrocarbons is present in the feed to the process. It is desired to operate with a feed which contains not more than about 0.1 volume percent of aromatic hydrocarbons, and preferably is virtually free from aromatic hydrocarbons.

The process of the invention requires no inhibitor when isomerizing butanes; the presence of a cycloparaffin inhibitor to moderate the cracking activity of the catalyst being necessary when pentanes and/or hexanes are being isomerized, particularly at higher temperatures absence of or smaller amounts of the hereinafter defined inhibitor results in the production of undesirable quantities of lower molecular weight compounds. To illustrate, hexane tends to form isopentane and isobutane in undesirable amounts in the absence of an inhibitor. The inhibitor utilized in the process of the invention is a cycloparaffin having not more than 6 carbon atoms in the nucleus and a total of not more than 9 carbon atoms. In general, the feed contains at least about 3 volume percent of cycloparaffin inhibitor when isomerizing pentanes and/or hexanes. More than this amount is commonly used and is determined by a combination of feed composition and temperature of operation. In general, hexane feeds at temperatures on the order of 120° F., contain from about 10-20 volume percent of cycloparaffin inhibitor such as cyclohexane. The preferred cycloparaffin concentration suitable for inhibiting cracking is in the range of about 3-15 mol percent, preferably 7-15 percent when isomerizing hexanes or mixed pentane-hexane feeds, and about 5-10 percent when isomerizing pentane feed. The cycloparaffins themselves will be isomerized in the process to near-equilibrium composition. Thus, for example, methylcyclopentane can be used as cracking inhibitor and be simultaneously converted to predominantly cyclohexane which is also an effective cracking inhibitor.

A particularly suitable source of feed to the process from the standpoint of the refiner desiring upgrading of octane numbers is a "$C_6$" fraction obtainable by treatment of a catalytic reformate. Such a fraction consists of a mixture of hexane isomers, 6 carbon atom cycloparaffins, and 3-5 percent benzene. The feed to the process is obtained by treatment of this fraction to eliminate the benzene either by physical removal or conversion to cyclohexane by hydrogenation. By such treatment, this very suitable feed for the isomerization process consists of a mixture of hexane isomers from about 5-20 volume percent of 6 carbon atom cycloparaffin and not more than about 0.1 volume percent of benzene.

The catalyst utilized in the process, broadly considered, is an aluminum halide positioned on surface-hydroxyl-containing adsorbent solid and associated with hydrogen halide. It is preferred that the hydrogen halide correspond to the particular aluminum halide used. Aluminum trichloride ($AlCl_3$) is a preferred aluminum halide and will be used in the subsequent discussion for the purpose of illustration. More specifically, the preferred catalyst is the reaction product of aluminum chloride with surface hydroxyl groups of surface-hydroxyl-containing adsorbent solid associated with hydrogen chloride. The catalyst is most useful for hydrocarbon conversion reactions carried out at temperatures below about 200° F., because the catalyst is relatively unstable at higher temperature due to dissociation of the associated HCl component.

The term "surface-hydroxyl-containing adsorbent solid" includes the various forms of silica gel and the various alumina materials, natural and synthetic, which have a substantial portion of the surface existing in the hydroxyl form, as opposed to the "dehydrated" oxide form. No adsorbed water, as such, should be present. Aluminas which can be treated to produce the required surface hydroxyl groups are gamma, eta, and chi forms of alumina. The surface-hydroxyl-containing adsorbent solids are not significantly active for hydrocarbon isomerization, under the other conditions of the process, nor is the aluminum chloride reaction product alone significantly active; yet the reaction product, when conjoined with HCl produces more hydrocarbon conversion than do the same amounts of aluminum chloride and HCl alone, or surface-hydroxyl-containing adsorbent solid either alone or with HCl, under the other conditions of the process. "Under the other conditions of the process" means all essential operational elements held the same excluding the catalyst.

It has been discovered that aluminum chloride can exist on the surface of alumina in three forms: reacted with surface hydroxyl groups to form —O—$AlCl_2$ groups, chemisorbed $AlCl_3$ monomer, and as physically adsorbed aluminum chloride. In the case of silica gel, aluminum chloride can exist on the surface in only two forms: reacted with surface hydroxyl groups to form —O—$AlCl_2$ groups, and physically adsorbed aluminum chloride. The reacted and chemisorbed forms will associate HCl and thus form an active catalyst species; however, the chemisorbed monomer form is unstable and the $AlCl_3$ in this form tends to be desorbed by process and/or regeneration fluids, thus destroying this catalyst species. On the other hand, the reacted form is quite stable and, for example, the —O—$AlCl_2$ groups are not destroyed by atmospheric pressure inert gas purge at temperatures as high as 700° F., far above the sublimation temperature of $AlCl_3$. The physically adsorbed form is even unstable than the chemisorbed monomer form and is not a practical catalyst component.

The surface-hydroxyl-containing adsorbent solid should have a substantial amount of surface area. It has been found that only those pores in the adsorbent solid having diameters greater than about 35 Angstrom units (35 A.) are utilized in forming the catalyst, therefore it is the surface area of the pores larger than about 35 A. which is important. The surface of adsorbent solid pores having diameters greater than about 35 A. is termed herein "effective surface" and the term "effective surface area" is used herein to mean the total surface area of an adsorbent solid minus the surface area attributable to surface within pores having diameters less than about 35 A. The surface areas and pore diameters herein are those which are determined by nitrogen adsorption techniques. It is desirable that the surface-hydroxyl-containing adsorbent solid have an effective surface area in the range of about 25-700 square meters per gram (sq. m./gm.), preferably 50-500 sq. m./gm.

The bauxitic materials which are naturally occurring impure alumina hydrates, such as bauxite and laterite, are a suitable source of surface hydroxyl-containing adsorbent solids. These bauxitic materials may contain alumina monohydrates, for example, European bauxites, or they may contain alumina trihydrate, for example, North American, South American, and East Indian bauxites. Alumina is the predominant component; iron oxide is present—as much as 25 weight percent; silica as $SiO_2$ (or as an inorganic silicate, such as kaolinite) is present; titanium dioxide is usually another more or less major component; other materials in more or less minor amounts are present. The bauxites may be used as a source of surface-hydroxyl-containing adsorbent solid as produced in the mine, or they may be treated to reduce the iron oxide content or the silica content or the titanium dioxide content. It is important to minimize the alkali metal oxide content.

The aluminous materials which contain substantial amounts, or even large amounts, of oxides other than aluminum oxide may be suitable for use in preparing surface-hydroxyl-containing adsorbent to be conjoined with aluminum chloride and HCl. Materials which contain silicon dioxide (wherein the $SiO_2$ is present as such or in combination with the aluminum oxide—and water) along with aluminum oxide and hydrate water may be surface-hydroxyl-containing adsorbent solids. The synthetic material known as silica-alumina, which is used as a hydrocarbon cracking catalyst, is such a suitable aluminous material.

It is preferred to use alumina materials (synthetic or naturally-occurring, such as bauxite) as the surface-hydroxyl-containing adsorbent solid for preparation of the catalyst. Any adsorbed molecular water should be removed from the solid prior to contacting it with aluminum halide, lest the effectiveness of some of the aluminum chloride to form a catalyst be destroyed by reaction or hydration with the water. Adsorbed water can be removed by drying or calcining the solid; however, if calcination is used it should not be carried out under conditions of temperature and time so severe as to destroy the surface hydroxyl groups.

A convenient method of ascertaining whether adsorbed water is absent and an effective amount of surface hydroxyl groups is present in a particular adsorbent solid to be used in preparing catalyst is to determine the weight loss of the defined solid upon heating to about 1832° F. This weight loss is termed "loss on ignition" (LOI).

It has been found that satisfactory surface-hydroxyl-containing adsorbent solids are those which contain little or no adsorbed molecular water and which lose about 2–10 weight percent, preferably about 4–8 weight percent in the case of the aluminas and 2–6 weight percent in the case of silica gel, of their original weight upon being heated to about 1832° F. The weight loss in these ranges is due, almost entirely, to the destruction of surface hydroxyl groups with the consequent liberation of water. Weight loss greater than about 10 weight percent generally indicates the presence of adsorbed molecular water. Weight loss less than about 2 weight percent is an indication that insufficient hydroxyl groups are present on the surface to form an appreciably effective amount of the preferred catalyst species. The optimum weight loss in the case of silica gel is generally about 2 weight percent lower than the optimum for the aluminas.

The surface-hydroxyl-containing adsorbent solid for use in forming the catalyst must be prepared in a manner providing a substantial portion of the effective surface in the hydroxyl form so that there are available hydroxyl groups for reaction with aluminum chloride. It is preferred that at least about 50 percent of the effective surface be in the hydroxyl form. Optimally, nearly all of the effective surface is in the hydroxyl form with no molecular water present.

One method of producing a suitable surface-hydroxyl-containing adsorbent solid is to calcine a silica and/or alumina containing material to produce an adsorbent solid containing at least one of the following adsorbent solid forms; silica gel, chi alumina, eta alumina, gamma alumina, or mixtures thereof such as silica-alumina. An example of a suitable alumina-containing material is alumina trihydrate, such as beta-trihydrate. Suitable calcination conditions of time and temperature (e.g. a temperature in the range of about 300 to 1100° F. for a time in the range of about 1–24 hours) will produce an adsorbent solid having the required surface area and pore size properties and a LOI less than about 2–4 percent. Water is then added to the calcined adsorbent solid in the amount of about 1–5 weight percent or more. This water is conveniently added in the form of steam. The added water is permitted to react with the surface of the adsorbent solid to produce surface hydroxyl groups. This hydrated adsorbent solid is then dried under carefully controlled conditions so that molecular water is removed without destroying an appreciable number of the surface hydroxyl groups. Suitable drying conditions are a temperature in the range of about 200–300° F. for a time of about 10–100 hours. A dried inert gas purge may be used to hasten the drying process. Bauxite treated in this manner will produce the defined surface-hydroxyl-containing adsorbent solid. Of course, if the adsorbent solid, such as bauxite for example, as received contains 8–10 percent or more of water, as determined by loss on ignition, the hydration step may be omitted.

Another method of preparing the defined surface-hydroxyl-containing adsorbent solids having substantially complete surface hydroxyl coverage and containing little or no molecular water is to first calcine the solid under the calcination conditions described above to reduce the LOI to below about 4 percent. The calcined solid is then treated with anhydrous hydrogen chloride to produce essentially 100 percent hydroxyl coverage of the surface. The HCl treatment is carried out at a temperature in the range of about 50–150° F., and a pressure of 0–400 p.s.i.g. or higher for a time of at least about 0.1 hour. Preferred treating conditions are a temperature of about 70–120° F., 100–300 p.s.i.g. and a time of about 1–25 hours. After the HCl treatment excess HCl is removed from the adsorbent solid by evacuation, inert gas purge, or other convenient means. Bauxite can be treated in this manner also to produce a satisfactory surface-hydroxyl-containing adsorbent solid.

The catalyst is formed by contacting aluminum chloride with the defined surface-hydroxyl-containing adsorbent solid and causing the aluminum chloride to react with the surface hydroxyl groups on the surface of the defined adsorbent solid, thus forming —O—AlCl$_2$ groups on the surface. During this reaction one mol of HCl is liberated for each mol of AlCl$_3$ reacted. HCl is then caused to associate, mol for mol, with the —O—AlCl$_2$ groups to form the active catalyst. While it is in no way intended to limit the invention by the soundness or accuracy of any theories advanced herein to explain what the active catalyst species is, it is postulated that an —O—AlCl$_2$ site, when associated with HCl, forms a proton and a negatively charged species, (—O—AlCl$_3$)$^-$, which constitutes the actual catalyst.

The aluminum chloride content corresponding to maximum catalyst activity is that amount of aluminum chloride required to provide a monolayer of reacted aluminum chloride molecules (i.e. reacted with hydroxyl groups to form —O—AlCl$_2$ groups) over the effective surface area of the defined adsorbent solid. The hydroxyl groups on the surface of a particular defined adsorbent solid having essentially 100% surface hydroxyl coverage are normally spaced closer together than are molecules of aluminum chloride in a monolayer. Therefore, not all of the hydroxyl groups on a solid having essentially complete hydroxyl coverage need be reacted to form a catalyst of maximum activity. It has been estimated that one gram of aluminum chloride will provide a monolayer of aluminum chloride molecules (or —O—AlCl$_2$ groups) over 534 square meters of effective surface area.

The preferred method of preparing the catalyst is to form a dry physical mixture of aluminum chloride and surface-hydroxyl-containing adsorbent solid and react the mixture at a temperature in the range of about 0–500° F., preferably about 200–350° F. Normally sufficient pressure is utilized to minimize sublimation of aluminum chloride from the reaction mixture to reduce aluminum chloride loss. A flowing stream of gas may be used as the heat transfer medium for heating the reaction mixture and cooling the reaction product. Hydrogen is a preferred gas, however other relatively unreactive gases such as nitrogen, helium, methane, ethane, propane, butane, etc. may also be used. The reaction time required decreases as the reaction temperature is increased. At the preferred reaction temperature of 200–350° F., a time of about 0.1 to 10 hours is normally sufficient to complete the reaction; however, longer reaction time is not detrimental. HCl is then caused to associate with the reaction product of aluminum chloride and surface-hydroxyl-containing adsorbent solid. This association must be done at a temperature below about 180–200° F. since it has been found that at higher temperature the association does not take place. In fact, a fully formed catalyst will liberate HCl if heated to a temperature of 180–200° F., or higher, even under pressures of 500 p.s.i. or more. The association with HCl is conveniently carried out by contacting the reaction product with anhydrous HCl at a pressure of about 10–500 p.s.i.a. and a temperature in the range of about 60–200° F. One mol of HCl associates for each mol of AlCl$_3$ which has reacted with the surface-hydroxyl-containing adsorbent solid. A time of about 1–100 hours is normally sufficient to complete the HCl association.

Any method of contacting aluminum chloride with the defined surface-hydroxy-containing adsorbent solid and reacting the aluminum chloride with surface hydroxyl groups may be used. For example, a dry physical mixture of aluminum chloride and the defined adsorbent solid (dry-mix) may be contacted, under suitable temperature conditions as described above, with an inert liquid to cause the reaction to take place. This preparation technique is particularly suitable for preparation of catalyst to be used in a fixed-bed operation, such as isomerization of butane, pentane, hexane, or mixtures thereof. In this case it is particularly convenient to form the dry-mix within the reaction vessel and circulate the inert liquid through the bed until the aluminum chloride reaction with the hydroxyl groups is essentially complete.

The inert liquid used in the catalyst preparation must be one which does not form addition compounds, complexes, or the like, with aluminum halide or on the adsorbent material. (To illustrate, certain ethers form stable complexes with aluminum chloride; aromatic hydrocarbons form complexes which possess no significant catalyst activity in conjunction with the adsorbent material; olefinic hydrocarbons form complexes which possess little catalyst activity in conjunction with the adsorbent material.) Halogenated hydrocarbons, such as methylene chloride and ethylene dichloride, are suitable liquids. The preferred inert liquids are saturated hydrocarbons which are liquid at the temperature of catalyst preparation. These liquid saturated hydrocarbons may be straight chain, branched chain, or cyclic in configuration. The normally liquid alkanes and cycloalkanes, such as butane, pentane, hexane, heptane, octane, cyclopentane, cyclohexane, methylcyclohexane, etc., and mixtures thereof are particularly suitable inert liquids.

Another convenient method of contacting the aluminum chloride with the surface-hydroxyl-containing adsorbent solid is to sublime aluminum chloride onto the surface of the solid; however, when sublimation is used, care must be taken not to carry out the sublimation under conditions which will destroy surface hydroxyl groups before they can be reacted with the aluminum chloride. Thus, it is preferred to use a carrier gas, for example hydrogen, nitrogen, and/or lower molecular weight paraffin hydrocarbons, to assist in subliming the aluminum chloride and to carry the aluminum chloride onto the adsorbent solid. Reaction of aluminum chloride with surface hydroxyl groups occurs during the sublimation procedure. After the desired amount of aluminum chloride has been added to the adsorbent the reaction may be completed. Completion of the reaction may be determined by checking for cessation of HCl liberation.

The most desirable ratio of $AlCl_3$ to the defined adsorbent solid depends upon the surface-hydroxyl content of the particular adsorbent solid used. For example, with surface-hydroxyl-containing adsorbent solid particles (gamma alumina, eta alumina, chi alumina, silica gel, or mixtures threof) of about 20-60 mesh size and having an effective surface area of about 230 sq. m./gm., the proportions will normally be about 25-35 weight percent $AlCl_3$ and about 65-75 weight percent adsorbent solid. Most catalyst-forming reaction mixtures comprise 10-50 weight percent $AlCl_3$ and 50-90 weight percent of the defined adsorbent solid.

The catalyst is extremely versatile because it can be prepared in a great number of particle sizes. The final catalyst configuration is determined by the configuration of the surface-hydroxyl-containing adsorbent solid used. The defined adsorbent solid may be in the form of extremely fine particles, for example, talc-like character. A range of particle sizes may be used, particularly for slurry contacting of catalyst and liquid hydrocarbons; in such an operation, the range of particle sizes may be from about 60 mesh to 300 mesh screen size. Larger size granules or grains are conveniently used to produce catalyst suitable for fixed bed operation, such as screen mesh size of 20-60 or mesh size of 4-8. Even larger sizes may be used where mass flow into and out of the pore structure is not a hindrance to effective operations. The defined adsorbent solid may be formed into regular shapes, such as pills of various thickness and diameter, for example, $\frac{1}{8}''$ by $\frac{1}{16}''$ or $\frac{1}{4}''$ by $\frac{1}{8}''$; or into spheres or extrudates of various sizes.

The catalyst prepared from aluminum chloride and the surface-hydroxyl-containing adsorbent solids described hereinabove does not differ in visual appearance from the adsorbent solid itself, i.e., the aluminum halide is not evident to visual examination. The catalyst flows as freely as the adsorbent solid itself. The catalyst is hygroscopic, therefore care should be taken to avoid contacting the catalyst with moisture.

The activity of the catalyst may, in some cases, be improved by treatment of the defined adsorbent solid prior to formation of the catalyst. For example, the defined adsorbent solid is in many instances improved in respect to final catalyst activity by treatment with an acid, such as hydrochloric acid, phosphoric acid, sulfuric acid, nitric acid, and acetic acid. Aluminas in particular show significant improvement in the activity of the formed catalyst after such acid treatment which probably serves to improve pore size distribution.

As had been pointed out above, one mol of HCl is liberated for each mol of $AlCl_3$ reacted with surface hydroxyl groups. It has also been pointed out that the reaction product (the adsorbent solid $—O—AlCl_2$) alone, i.e. without associated HCl, is not an active hydrocarbon conversion catalyst. It is possible to employ a catalyst preparation technique which will result in association of the liberated HCl with the $—O—AlCl_2$ groups to form active catalyst, without the addition of extraneous HCl. Batch reaction of $AlCl_3$ with surface-hydroxyl-containing adsorbent solid in an autoclave, in which liberated HCl is retained, is an example of such a technique. However, this is generally difficult and time consuming to accomplish. The difficulty and extended time required can be understood by realizing that each mol of HCl which is liberated during the reaction must in turn be associated with the reaction product in order to maximize catalyst yield. While we have prepared satisfactory catalysts in this manner, we prefer to react the aluminum chloride with surface hydroxyl groups at temperatures above about 200° F. in a flow system in order to achive higher reaction and heat transfer rates. We then prefer to conduct the HCl association as a separate step employing excess HCl, in order to reduce the time required to achieve essentially complete HCl association. Of course, not all of the aluminum chloride-hydroxyl group reaction product need be associated with HCl in order to obtain effective catalyst mass, since the unassociated $—O—AlCl_2$ groups are merely inert. It is clear however that maximum effectiveness of the catalyst mass produced is achieved when all of the reaction product is associated with HCl.

The process of the invention functions in batch operations to produce near equilibrium amounts of product without need for presence of hydrogen chloride promoter other than that used in preparing the catalyst. In flow operation the presence of hydrogen chloride in the isomerization zone markably improved catalyst life and/or catalyst activity. The amount of hydrogen chloride needed depends on the feed, the temperature of operation, etc. In general, the amount of hydrogen chloride present is from about 1 to about 15 weight percent based on the feed; more commonly, 2-8 weight percent. The hydrogen chloride is conveniently introduced into the system as a solution in the liquid feed.

The process of the invention is carried out under conditions such that feed hydrocarbons are in a liquid state. Sufficient pressure is maintained on the isomerization zone to keep the hydrocarbon in the liquid state at the particular temperature of operation.

The process of the invention is illustrated by the following specific tests which are not to be considered as limiting the scope of the claimed invention.

Certain tests were carried out in batch equipment utilizing glass reactors 3″ in diameter and 6″ long. The ends of the glass reactors were closed with steel flanges. Stirring was provided in the reactors by means of laboratory-type propeller stirrers operating at about 2,500 r.p.m. The reaction zone was brought to and maintained at the desired reaction temperature, above atmospheric temperature, by means of a thermostatically controlled electrical heating tape wound about the outside surface of the reactor. A Dry Ice trap was provided to collect gaseous products formed in the reactor. The batch experiments were carried out by introducing the catalyst into the reactor, starting the stirrer and then adding the feed. All of the batch runs described hereinafter were carried out at atmospheric pressure. In general, the batch runs were carried out at a standard temperature of 120° F. at a standard time of three hours. At the end of this time the liquid product was separated from the catalyst and analyzed by conventional procedure for isomer distribution.

Flow runs were made utilizing a bench size system wherein the reactor consisted of 5' of 1" I.D. glass pipe. The reactor was maintained at the desired temperature by means of electrical heating elements wrapped about the outside surface. In general, the flow runs were carried out up-flow through the reactor.

Example No. 1

In this run the feed stock was a hydrogenated hexane out of a catalytic reformate. The run was carried out in a batch reactor under typical conditions. In this run the surface-hydroxyl-containing adsorbent solid used in preparing the catalyst was a crystalline alumina having a surface area of 120 square meters per gram; the aluminum chloride was present somewhat in excess of the monolayer amount. The conditions of this run and the composition of the feed and of the total product are set out below.

Conditions:
Catalyst: Hydrocarbon (wt.) _____ 1
$AlCl_3$ on catalyst _____percent__ 17.5
Time, hrs. _____ 3
Temperature, ° F. _____ 122

| Composition, Wt. Percent | Feed | Total Product |
|---|---|---|
| Isobutane | | 0.2 |
| Isopentane | | 0.2 |
| n-Pentane | | 0.3 |
| Cyclopentane | | |
| Neohexane | | 41.6 |
| Diisopropyl | 2.7 | 8.1 |
| Methylpentanes | 47.8 | 32.5 |
| n-Hexane | 39.8 | 5.9 |
| Methylcyclopentane | 6.2 | 1.9 |
| Cyclohexane | 3.5 | 9.3 |
| Total | 100.0 | 100.0 |

Example No. 2

In this run tests were carried out using aluminum chloride alone and aluminum chloride with added hydrogen chloride. The feed to this series of tests in this run was that described in Example No. 1. An activator consisting of 0.6 volume percent based on feed was used in this series; the activator was pentene-2. The series was carried out at 122° F. and each determination was for the standard time of three hours. Set out below are the results of this run, wherein the neohexane (2,2-dimethylbutane) in the product was the measure of activity. The results set out below show that aluminum chloride alone is at best a poor catalyst at these conditions.

| Nominal* Catalyst: Hydrocarbon (wt.) | Nominal Percent $AlCl_3$ | Percent 2,2-$Me_2C_4$ in Product | |
|---|---|---|---|
| | | HCl not Added | HCl Added |
| 1 | 30 | 2.4 | 7.5 |
| 1 | 17.5 | .6 | 4.3 |

*In the absence of $Al_2O_3$, the catalyst:hydrocarbon ratio is fictitious and corresponds only to that ratio in effect when $Al_2O_3$ is present.

Example No. 3

Under the conditions and feed of Example No. 2, a series of determinations was made utilizing as the catalyst aluminum chloride adsorbed on alumina having a surface area of 120 square meters per gram. The results of this series are set out below and show a very large improvement in catalyst activity when both aluminum chloride and alumina are present.

| Catalyst:Hydrocarbon (Weight) | Percent $AlCl_3$ in Catalyst | Percent 2,2-$Me_2C_4$ in Product, HCl Not Added |
|---|---|---|
| 1.4 | 10 | 15.4 |
| 1.0 | 30 | 40.4 |
| 1.0 | 17.5 | 40.4 |

Example No. 4

Utilizing the batch reactor system described in Example No. 1, the feed described in Example No. 1, and 120 square meters per gram alumina, 30 percent $AlCl_3$ in the catalyst and a temperature of 122° F., a series of tests was carried out to illustrate the effect of the weight ratio of catalyst to hydrocarbon on the product composition. The results are given below in terms of the percent of neohexane present in the $C_6$ paraffin product fraction. Results are shown for times of one, two and three hours, respectively.

| Catalyst/Feed by Weight | Percent Neohexane-$C_6$ Paraffin Product | | |
|---|---|---|---|
| | One Hour | Two Hours | Three Hours |
| 0.33 | 17 | 28 | 47 |
| 0.50 | 26 | 38 | 41 |
| 0.76 | 39 | 45 | 48 |
| 1.01 | 42 | 47 | 49 |
| 1.43 | 46 | 48 | |

Example No. 5

In this run the effect of benzene content of the feed was examined. This series of tests was carried out in the batch reactor described in Example No. 1. The feed to this series was obtained by adding a predetermined amount of benzene to the virtually benzene-free feed described in Example No. 1. The catalyst in this series consisted of 17.5 percent of $AlCl_3$ on 120 square meters per gram alumina. The series was carried out at 122° F. and a contacting time was three hours. The weight ratio of catalyst to feed was 1:1. The effect of benzene on catalyst activity was measured by determining the percent of neohexane present in the $C_6$ paraffin fraction of the product. The results of this series are set out below.

| Benzene Vol. Percent Feed | Percent Neohexane |
|---|---|
| 0.05 | 29.9 |
| 0.20 | 18.9 |
| 0.35 | 14.0 |
| 0.50 | 9.2 |

Example No. 6

Utilizing the equipment, catalyst, etc., described in Example No. 5, a run was made at 140° F. with 0.05 volume percent benzene added to the feed. The neohexane in the $C_6$ paraffin fraction of the product was 40.3 percent. This run illustrates the fact that the effect of benzene is decreased as the temperature of contacting is increased.

Example No. 7

Example No. 7 was run under the operating techniques of Example No. 5, utilizing catalyst consisting of 30 percent $AlCl_3$ on 120 square meters per gram alumina. Two determinations were made, each determination containing 0.05 volume percent benzene added to the feed described in Example No. 1. The *first* determination was carried out at 122° F. and gave neohexane content of 33.7 percent. The *second* determination was carried out at 140° F. and gave a neohexane content of 39.3 percent. These examples, 5–7, illustrate the flattening of the yield as the amount of aluminum chloride present in the catalyst passes the theoretical monolayer content.

Example No. 8

A series was carried out on the bench scale flow reactor described above, using the feed described in Example No. 1. The catalyst in this run consisted of about 14 percent aluminum chloride on bauxite. The catalyst particles were screened to mesh size of 8–12. The flow run was carried out at 122° F. and a weight hourly space velocity of 0.1. The amount of HCl introduced along with the feed was varied over definite intervals of the run. Effect on the neohexane content of the $C_6$ paraffin fraction of the product was observed by taking samples of the product during the particular run interval. It was observed that in each interval the neohexane content decreased slowly. Increasing the HCl content accomplished an increase in neohexane content; at about 400 hours time the catalyst activity continued to decline regardless of HCl presence. It was also observed that the decline of activity during an interval could be increased by reducing the HCl content of the feed during that interval. The results of this run are set out below.

| Interval Time, Hr. | Wt. Percent HCl in Feed | Percent Neohexane Hexane Fraction |
|---|---|---|
| 0–80 | .3 | 38.5–27.5 |
| 115–160 | .45 | 31–40 |
| 160–240 | ca.4 | 40 |
| 240–335 | .4–.2 | 40–27.5 |
| 350–400 | .65 | 42.5–31 |
| 400–505 | .6–.4 | 31–23 |

Example No. 9

The results of experiments showing that all adsorbent solids are not equivalent nor are all alumina materials equivalent for use in making the catalyst and that aluminum chloride alone is relatively inactive in our process are listed in the following Table I. An eta-alumina alone and HCl treated eta-alumina containing 5.12 wt. percent chloride alone are also shown to be inactive.

In each case where solid and aluminum chloride both were used the "catalyst" was prepared by forming a dry-mix of solid aluminum chloride with the solid being tested and contacting this mixture with liquid, saturated hydrocarbon at 75–125° F. HCl was associated with the catalyst in each test except Test 14 which shows the necessity for HCl association in order to produce a catalyst having significant activity. The catalyst was tested for activity in catalyzing the isomerization of hexane isomers to produce 2,2-dimethylbutane (2,2-DMB) commonly called neohexane. Neohexane is a valuable gasoline blending component having good volatility characteristics, a clear Research octane number of 91.8 and a clear Motor octane number of 93.4. The isomerization was carried out at a temperature of 122° F. in small stirred batch reactors a reaction time of 3 to 4 hours, except Test 14 which was tested in a flow run at 0.2 weight hourly space velocity (WHSV) and 75° F. Other tests have shown that results obtained in tests of this type give conversions comparable to the batch tests. The products were analyzed by gas chromatography. Other experiments have shown that near maximum conversion is obtained in these batch tests in 3 hours under the conditions used.

The 2,2-DMB conversion reported is the concentration of neohexane in the hexane fraction of the product, excluding cyclohexane which was used in the feed in a concentration of about 10 weight percent to inhibit cracking of hexanes to lighter products. The cyclohexane did not undergo appreciable reaction during the tests. In each case, except in the charcoal test where 2-methylpentane was used, the feed material was a saturated hexane fraction of catalytic reformate. In Tests 1 and 2, aluminum trihydrate was the alumina-containing starting material which was then calcined to the indicated LOI, thus the solid actually used in preparing the catalyst was gamma alumina.

TABLE I

| Test No. | Solid tested | LOI, wt. percent | Aluminum chloride, wt. percent of total solids | 2,2-DMB Conversion, wt. percent |
|---|---|---|---|---|
| 1 | Alumina trihydrate | 8.9 | 50 | 47.6 |
| 2 | Alumina trihydrate | 4.7 | 50 | 47.8 |
| 3 | Eta alumina | 2.6 | 30 | 48.6 |
| 4 | Silica gel | 2.9 | 25 | 47.1 |
| 5 | Silica alumina [1] | 1.4 | 30 | 35.6 |
| 6 | Gamma alumina | 4.0 | 25 | 39.6 |
| 7 | Alpha alumina | nil | 50 | 1.5 |
| 8 | Adsorbent charcoal | | 50 | 13.5 |
| 9 | Aluminum chloride | | 100 | 8.0 |
| 10 | Bauxite | 3.5 | 20 | 36.5 |
| 11 | Chi alumina | [2] 3 | 20 | 43.9 |
| 12 | Eta alumina alone | 6.0 | 0 | 0 |
| 13 | HCl treated eta alumina containing 5.12 wt. percent Cl. | [3] 5.8 | 0 | 0 |
| 14 | Eta alumina | [2] 1.2 | 25 | [4] 9.5 |

[1] 86% silica, 14% alumina.
[2] Estimated.
[3] Before HCl treatment.
[4] Catalyst material not associated with HCl, tested in flow run at 0.2 WHSV and 75° F.

Example No. 10

The advantage of conducting the HCl association as a separate step prior to placing the catalyst on oil rather than associating catalyst with HCl absorbed from the feed is shown by the following comparison hexane isomerization runs. The runs are made in a continuous flow pilot plant under the following conditions, employing the same type feed as described in Example No. 9: space velocity (Wo/hr./Wc) of 0.15, reactor pressure of 200 p.s.i.g., reactor temperature of 100–110° F. and 5–7 wt. percent HCl in the feed. The catalyst materials are prepared by forming a dry physical mixture of 75 wt. percent eta-phase alumina and 25 wt. percent aluminum chloride in the reactor and heating the mixture to 300° F. with a flowing stream of hot hydrogen under a pressure of 300 p.s.i.g. then stopping the flow and allowing the mixture to stand in the presence of hydrogen for a few hours (about 24 hours). The catalyst materials are then cooled by a flowing stream of cool hydrogen.

One such catalyst material was then treated under pressure with gaseous HCl for 60 hours at 80° F. to effect HCl association and complete the formation of the catalyst. This catalyst was then placed on stream. The catalyst activity was checked after the first 12 hours of operation and the catalyst was found to be producing 54% neohexane in the hexane product. After 100 hours of operation this catalyst was still quite active, producing 51% neohexane in the product hexanes.

For comparison, another such catalyst material was not associated with HCl before being placed on oil, but was put immediately on stream and the HCl association effected by the HCl in the feed process stream. After the first 12 hours on stream this catalyst was producing only 41% neohexane in the product hexanes. The activity of this catalyst continued to increase as the HCl association was gradually effected and finally reached a peak activity after being on stream 100 hours, producing 51% neohexane in the product hexanes at that time.

Thus the two catalysts reached equal activity after each had been on stream 100 hours, but the initial period of high neohexane production achieved with the separately associated catalyst was lost with the catalyst which was associated with HCl on stream.

Thus having described the invention, what is claimed is:

1. An isomerization process comprising: contacting, under liquid phase conditions, an isomerizable hydrocarbon feed selected from the class consisting of (a) paraffins having from 4 to 7 carbon atoms and (b) cycloparaffins having from 5 to 6 carbon atoms in the nucleus and a total of 6 to 9 carbon atoms, said feed containing 0–20 volume percent, based on said feed, of a cycloparaffin inhibitor having not more than 6 carbon atoms in the nucleus and a total of not more than 9 carbon atoms, and not more than 0.5 volume percent, based on said feed, of aromatic hydrocarbon; said contacting of said feed being carried out at a temperature from about 30° F. to about 160° F., for a time sufficient to obtain a substantial degree of isomerization of said feed; said contacting of said feed being carried out in the presence of a solid particulate catalyst consisting essentially of the product formed by reacting aluminum halide with surface hydroxyl groups of surface-hydroxyl-containing adsorbent solid and contacting the solid product of said reaction with hydrogen halide at a temperature in the range of about 60 to 200° F.; and said contacting of said feed being carried out in the presence of hydrogen halide, in an amount from about 1 to about 15 weight percent, based on said feed.

2. The process of claim 1 wherein said paraffin is n-butane.

3. The process of claim 1 wherein said paraffin is n-pentane.

4. The process of claim 1 wherein said paraffin is n-hexane.

5. The process of claim 1 wherein said feed consists of a mixture of hexane isomers, from about 3 to 20 volume percent of cycloparaffin having 6 carbon atoms and not more than about 0.1 volume percent of benzene.

6. The process of claim 1 wherein said temperature of said contacting of said feed is from about 80° F. to about 140° F.

7. The process of claim 1 wherein said surface-hydroxyl-containing adsorbent solid is bauxite.

8. The process of claim 1 wherein said surface-hydroxyl-containing adsorbent solid is activated alumina.

9. The process of claim 1 wherein said aluminum halide is aluminum chloride.

10. The process of claim 1 wherein said cycloparaffin inhibitor is cyclohexane.

11. A paraffin isomerization process comprising contacting under liquid phase conditions, isomerizable paraffin feed hydrocarbon having 4–6 carbon atoms, there being present in said feed 0–20 volume percent of a cycloparaffin inhibitor having not more than 6 carbon atoms in the nucleus and a total of not more than 9 carbon atoms, said feed containing not more than 0.1 volume percent of benzene; with a solid particulate catalyst consisting essentially of the reaction product of about 15–35 weight percent of aluminum chloride with surface hydroxyl groups of particulate adsorbent alumina associated with hydrogen chloride as a result of contact with hydrogen chloride at a temperature in the range of about 60 to 200° F., there being present in said feed hydrogen chloride in an amount, based on said feed, of about 2–8 weight percent; and said contacting of said feed with said catalyst being carried out at a temperature of about 80–140° F. for a time sufficient to isomerize said feed to about the equilibrium isomer composition for the particular feed.

12. The process of claim 11 wherein said feed is n-butane and said cycloparaffin inhibitor concentration in said feed is essentially zero.

References Cited by the Examiner
UNITED STATES PATENTS

| | | | |
|---|---|---|---|
| 2,311,713 | 2/1943 | Thomas et al. | 260—683.75 |
| 2,438,421 | 3/1948 | Sensel et al. | 260—683.76 |
| 2,900,425 | 8/1959 | Bloch et al. | 260—666 |

DELBERT E. GANTZ, *Primary Examiner.*

V. O'KEEFE, *Assistant Examiner.*